United States Patent Office 3,735,007
Patented May 22, 1973

3,735,007
CLEAR LIQUID LAXATIVE-ANTACID COMPOSITION
Herbert Lapidus, Edison, N.J., and Leonard Mackles, New York, N.Y., assignors to Bristol-Myers Company, New York, N.Y.
No Drawing. Filed Sept. 21, 1970, Ser. No. 74,243
Int. Cl. A61k 27/00
U.S. Cl. 424—158                                    10 Claims

ABSTRACT OF THE DISCLOSURE

A clear liquid laxative-antacid composition containing magnesium hydroxide, an amino acid and an oxy or oxo acid in an aqueous medium.

---

This invention relates to clear liquid laxative-antacid compositions. It concerns, more particularly, liquid products which serve both as laxatives and antacids and which are further characterized by the fact that they are eye-appealing dosage forms which are more palatable than similar products that are currently available.

Aqueous antacid or laxative preparations containing magnesium compounds are well known in the prior art. For example, an aqueous magnesium hydroxide preparation useful as an antacid or laxative has been sold commercially for a good number of years as Milk of Magnesia. This product is a white, opaque more or less viscous suspension of magnesium hydroxide in water. It contains varying proportions of water and is notable for the fact that it separates into two phases on standing. This product has the obvious disadvantage that it needs to be thoroughly shaken before it is administered. Moreover, it has a chalky, unpalatable taste which is very difficult to mask.

Another magnesium containing product commonly used pharmaceuticaly is Citrate of Magnesia which is sold as a clear solution containing magnesium citrate in concentrations of 1.55–1.9% as MgO. This is recommended for its laxative properties; however, it has *no* acid consuming capacity. Moreover, it has a pronounced disagreeable saline taste and must be taken in large quantities to be effective. The suggested dose for this product is 6–12 fluid ounces.

It has now been found, in accordance with the present invention, that crystal clear liquid laxative-antacid products can be prepared containing high concentrations of magnesium as the oxide (e.g. 7.4%) which are easily flavored. These products are at least four times as effective as laxatives, when compared with Milk of Magnesia containing approximately the same concentration of magnesium. Furthermore, they have acid consuming capacities which are approximately the same as that of Milk of Magnesia and are far superior to the Citrate of Magnesia which, as noted above, has no acid consuming capacity.

It is accordingly an object of the present invention to provide effective liquid laxative-antacid products which are clear so as to be eye-appealing dosage forms and that can be made more palatable than prior art products.

It is a further object of the present invention to provide magnesium containing products of the character set out in the above object which avoid the disadvantages of similar commercially available laxatives and/or antacid products.

Other and more detailed objects of this invention will be apparent from the following description and claims.

In accordance with the present invention crystal clear aqueous solutions having laxative and antacid properties are prepared by incorporating in an aqueous medium magnesium hydroxide, a non-toxic pharmaceutically acceptable organic oxy or oxo acid and a non-toxic pharmaceutically acceptable amino acid. In preparing these compositions a mixture of the magnesium hydroxide, the amino acid and the oxy or oxo acid in water is preferably heated to boiling and then filtered to prepare a clear solution. The magnesium hydroxide may be added as such or may be formed in situ. Preferably, however, the former procedure is followed.

Any of a variety of pharmaceutically acceptable amino acids may be used for the present purpose. These acids ordinarily will be $\alpha$-amino acids that are non-toxic and pharmaceutically acceptable. A class of amino acids that are especially suitable are those that are naturally occurring or are produced by the hydrolysis of proteins. These include such amino acids as: lysine, tryptophan, histidine, phenylalanine, leucine, isoleucine, threonine, methionine, valine, arginine, glycine, alanine, serine, norleucine, glutamic acid, proline, hydroxyproline, tyrosine, cystine, aspartic acid, citrulline, etc.

The quantity of amino acid that will be incorporated in the present compositions will vary somewhat and will be related to the magnesium hydroxide content. Ordinarily, the molar ratio of magnesium hydroxide to amino acid will be in the range of 1 mole of magnesium hydroxide to about 0.5 to 5 moles of amino acid and preferably in the ratio of 1:2.

The acids, aside from the amino acid, employed in this invention are oxo or oxy carboxylic acids, i.e., a keto or a hydroxy acid. The acids selected from this group will likewise be non-toxic, pharmaceutically acceptable acids and serve at least a two-fold purpose. They are used to reduce the pH of the composition to an orally acceptable level and act to further stabilize the solution so as to prevent the precipitation of insoluble magnesium compounds on storage. The oxo or oxy acid is also preferably selected with the taste in mind since the product is intended for oral administration. Accordingly, the acid selected will ordinarily be organoleptically acceptable per se, e.g., fruit acids. However, when the acid employed has a disagreeable taste, this can be compensated for by appropriate flavoring agents.

These oxo or oxy acids, among other reasons, are added to reduce the pH of the composition formed by mixing the magnesium hydroxide and amino acids. Ordinarily enough oxo or oxy acid is added to bring the pH down to an orally acceptable level, i.e., at least to about 9.5 and preferably at least about 8.0. The lower pH limit of the composition can vary widely with the particular amino acid selected and the oxo or oxy acid. In general, however, the pH will not be below about 7.0.

The quantity of oxo or oxy acid employed will be dependent on the quantity and type of amino acid utilized. In general, this will be determined by the final pH desired, i.e., the acid is added in sufficient amount to bring the composition to the desired pH.

The oxo or oxy acid employed can be described by the formula XRCOOH wherein X is the group =O or —OH and R is an organic residue. The organic residue R may also contain other keto oxygens and/or hydroxy groups. In addition, this organic residue may carry additional carboxy groups.

More particularly, the oxo or oxy acids useful herein may be described by the general formula $$(Z)_c(Y)_b(X)_aR\text{—COOH}$$

in which:

R is an aliphatic carbon chain having up to 5 carbon atoms;
X is hydroxy;
Y is keto oxygen;

Z is carboxy;
a is a number from 0 to 5;
b is a number from 0 to 1;
c is a number from 0 to 2;
the sum of $a+b+c$ being 1 to 5;

the radicals X, Y and Z being bonded to the carbon chain R, and the remainder of the valence positions on the carbon chain R, not occupied by hydroxy, keto oxygen or carboxy being occupied by hydrogen. By way of illustrating particular oxo and oxy acids that are useful for the present purpose, mention may be made of the following:

citric acid (hydroxypolycarboxylic),
gluconic (polyhydroxycarboxylic),
lactic (monohydroxymonocarboxylic),
levulinic (ketocarboxylic).

It has further been found that the addition of a polyhydric alcohol to the present compositions further serves to stabilize them and prevent precipitation of insoluble magnesium compounds particularly at elevated temperatures. If they are judiciously selected, they may also serve to give the composition a pleasing sweetness. These alcohols will be non-toxic and pharmaceutically acceptable and may be described generally by the formula OHROH wherein R is an organic moiety which may contain additional hydroxy groups. More particularly, the polyhydric alcohols that are useful for the present purposes may be defined by the general formula

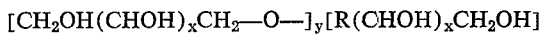

or anhydrides thereof in which:

R is the monovalent radical $CH_2OH$— or the divalent radical —CHOH—;
x is a number from 0 to 4; and
y is 0 to 1
the radical R being —CHOH— when y is 1 and $CH_2OH$— when y is zero. Thus, they may be simple carbon chain linked polyhydric alcohols or their anhydrides or ether linked polyhydric alcohols or their anhydrides. The anhydride form of these polyhydric alcohols are commonly found among the sugars and other lactones.

By way of illustrating particular polyhydric alcohols that may be employed in the present invention, mention may be made of glycerin, sorbitol, sucrose or other non reducing sugars, etc.

The quantity of polyhydric alcohol, when employed, can constitute varying proportions of the composition. By way of illustration it may comprise from about 5 to 40% by weight of the total composition.

If desired, a preservative may be added to the present composition to control the growth of microorganisms. Any of a wide variety of preservatives may be used for this purpose of which mention may be made of sodium benzoate, ethyl alcohol, benzoic acid; ethyl-, methyl-, butyl-, propylparaben; sorbic acid, sodium sorbate, etc. In a preferred form of this invention ethyl alcohol is the preservative of "choice." Aside from the preservatives other ingredients may be added to augment the organoleptic or the other characteristics of this composition. These include flavoring agents, coloring agents, etc.

The unit dose for administering the compositions of this invention will vary somewhat with the specific nature of the composition. Ordinarily a unit dose will consist of about 5 to 15 ml. of the liquid preparation. This will give effective laxative and antacid action.

The following examples are further illustrative of the present invention. It is to be understood, however, that the invention is not limited thereto. Unless otherwise specified, the quantities of ingredients are expressed in percent by weight of the total composition.

EXAMPLE 1

| | Percent |
|---|---|
| $Mg(OH)_2$ | 10 |
| Glycine | 20 |
| Citric acid | 14 |
| $H_2O$ | 56 |
| | 100 |

The above components were heated to boil and filtered. The resulting solution is clear, having a pH of 8.5 and a bland taste. A unit dose of this material consists of 5 to 15 ml. of the liquid.

EXAMPLES 1A AND 1B

A composition was prepared in accordance with Example 1 excepting that 30% by weight of lactic acid is employed in place of the citric acid and 40% by weight of $H_2O$ is employed.

Similarly, a composition was also prepared in accordance with Example 1 excepting that 35% by weight of levulinic acid is employed in place of the citric acid and 35% by weight of $H_2O$ is utilized.

EXAMPLE 2

| | Percent |
|---|---|
| $Mg(OH)_2$ | 7.5 |
| Glycine | 14.5 |
| Citric acid | 11.5 |
| Sorbitol (70% aq. sol.) | 29.5 |
| $H_2O$ | 37.0 |
| | 100.0 |

The above components were heated to boiling and filtered. A clear solution was obtained having a pH of 8.35. A unit dose of this composition consists of 5 to 15 ml. of the liquid.

EXAMPLE 2A

A composition was prepared in accordance with Example 2 excepting that in place of the sorbitol, 30% by weight of glycerine is employed and the composition contains 37.5% by weight of water.

EXAMPLE 3

| | Percent |
|---|---|
| $Mg(OH)_2$ | 7.5 |
| Glycine | 14.5 |
| Citric acid | 12.0 |
| Sorbitol (70% sol.) | 20.0 |
| Sucrose | 15.0 |
| $H_2O$ | 31.0 |
| | 100.0 |

The above components were heated to boiling and filtered. A clear solution was obtained having a pH of 8.30. A unit dose of this composition consists of 5 to 15 ml. of the liquid.

EXAMPLE 4

| | Percent |
|---|---|
| $Mg(OH)_2$ | 7.5 |
| Alanine | 14.5 |
| Citric acid | 11.5 |
| Glycerin | 30.0 |
| $H_2O$ | 36.5 |
| | 100.0 |

The above components were heated to boiling and filtered. A clear solution was obtained having a pH of 8.35. A unit dose of this composition consists of 5 to 15 ml. of the fluid.

EXAMPLES 4A AND 4B

A composition is prepared in accordance with Example 4 excepting that 24.5% by weight of lactic acid is employed in place of the citric acid and the water constitutes 23.5% by weight of the composition.

In a similar fashion a composition is prepared in accordance with Example 4 excepting that 30% by weight of levulinic acid is used in place of the citric acid and the water constitutes 18% by weight of the composition.

EXAMPLE 4C

A composition is prepared in accordance with Example 4 excepting that 20% by weight of sucrose is employed in place of the glycerin and the composition contains 46.5% by weight of water.

EXAMPLE 5

| | |
|---|---|
| $Mg(OH)_2$ | 7.410 |
| Glycine | 14.810 |
| Citric acid | 12.600 |
| Sorbitol (70% aq. sol.) | 18.510 |
| Ethyl alcohol (95%) | 6.140 |
| Sucrose | 9.630 |
| Flavor | 0.125 |
| $H_2O$ | 30.775 |
| | 100.000 |

The above components except the ethyl alcohol and flavor were heated to boiling, filtered and cooled. Upon cooling, the alcohol and flavor are added. A clear, good tasting solution is obtained having a pH of 8.0. A unit dose of this composition consists of 5 to 15 ml. of the liquid.

As noted above, the Citrate of Magnesia of the prior art has *no* acid consuming capacity. The present compositions, on the other hand, although they contain an acid which may be citric acid, have substantially the same acid consuming power as Milk of Magnesia. Thus, whereas the products of this invention as illustrated, e.g., by Example 5 above, required 23 ml. of 0.1 N HCl per ml. to obtain a pH of 3.5, Milk of Magnesia requires 26 ml. of 0.1 N HCl per ml. to obtain the same pH. However, as shown in more detail below the present compositions are far more effective than Milk of Magnesia as a laxative.

According to Goodman and Gilman (1965), magnesium-containing compounds are laxatives by virtue of the fact that the magnesium ion is not absorbed in the gastrointestinal tract, hence it stays in the lumen in a soluble form retaining a certain amount of water to maintain isotonicity. The increased water retained in the lumen then acts as a mechanical stimulus that increases intestinal motor activity and the intestinal contents are rapidly propelled into the colon. The normal absorption of fluid in the colon is similarly impeded, and the colonic contents remain liquid and are promptly expelled.

The cathartic effects of orally administered compositions of the present invention and of a leading commercially available Milk of Magnesia product were compared in rats utilizing two parameters. One measured the amount of moisture in the small intestinal contents and the other the propulsive action of the small intestine, expressed as the percentage of the intestine traversed by a test meal. Both procedures are described fully below.

Comparison of laxative effectiveness between composition of this invention and commercial Milk of Magnesia in terms of moisture gained in small intestine of rats Materials tested: (a) 1.0, 2.0 and 4.0 ml./kg. dosages of a clear liquid composition encompassed in the present invention identified as Formula No. 195 and having the following composition:

Formula No. 195

| | Percent by weight |
|---|---|
| Magnesium hydroxide powder | 6.67 |
| Glycine | 13.33 |
| Citric acid, powder, anhydrous | 10.00 |
| Sorbitol (aq. sol., 70%) | 26.60 |
| Alcohol, ethyl, 95% USP | 10.47 |
| Flavor | 0.20 |
| Water | 32.73 |
| | 100.00 |

(b) 1.0, 2.0 and 4.0 ml./kg. dosages of commercial Milk of Magnesia product;

(c) Control 4.0 ml./kg. tap water.

Method: One hundred and forty unfasted rats (20 per test group) were dosed with either the Formula 195, commercial Milk of Magnesia or Control. Each animal was sacrificed 15 minutes after dosing and the contents of its small intestine expressed into a small tared aluminum weighing cup. The contents were dried to a constant weight which was recorded. The difference between the wet and dry weight of the intestine's contents indicates the amount of moisture found in the intestine. The greater the amount of moisture, the more effective the test product is as a laxative.

The test was conducted over four days with 35 rats (5 per group) run on each of the test days. Test groups were balanced with respect to the weight of the test animals.

The results of these tests are summarized in Table I below. The legends appearing in this table have the following significance:

(1) CL4, CL2 and CL1—animals dosed with 4, 2 and 1 ml./kg. respectively of Formula No. 195;

(2) PH4, PH2 and PH1—animals dosed with 4, 2 and 1 ml./kg. respectively of the commercial Milk of Magnesia;

(3) PL—animals dosed with placebo (4 ml./kg. tap water).

TABLE I

[Comparison of clear laxative-antacid Formula No. 195 and commercial Milk of Magnesia]

| Avg. body weight (gms.) | | Avg. wet weight of intestinal contents (gms.) | | Avg. dry weight of intestinal contents (gms.) | | Avg. moisture content (gms.) | | Avg. ratio of moisture content to dry weight of intestinal contents | |
|---|---|---|---|---|---|---|---|---|---|
| 158.15 | CL4 | 3.997 | CL4 | 0.601 | CL4 | 3.396 | CL4 | 5.750 | CL4 |
| 156.00 | CL2 | 3.494 | CL2 | 0.552 | CL2 | 2.941 | CL2 | 5.542 | CL2 |
| 155.15 | PH4 | 2.793 | CL1 | 0.475 | PH4 | 2.355 | CL1 | 5.451 | CL1 |
| 152.40 | PH2 | 2.780 | PH4 | 0.456 | PH2 | 2.305 | PH4 | 4.988 | PH4 |
| 151.10 | PL | 2.581 | PH2 | 0.438 | CL1 | 2.126 | PH2 | 4.758 | PH2 |
| 150.65 | CL1 | 2.345 | PL | 0.437 | PL | 1.908 | PL | 4.362 | PL |
| 146.95 | PH1 | 2.275 | PH1 | 0.429 | PH1 | 1.846 | PH1 | 4.299 | PH1 |

From Table I it is seen that both the clear laxative-antacid of this invention and the Milk of Magnesia enhanced the amount of water in the intestinal lumen of unfasted rats to whom the drugs had been administered orally. The absolute amounts of water were significantly different from each other at each dose level of the clear laxative-antacid, but not at each dose level of Milk of Magnesia. The responses to 1 or 2 ml./kg. of the latter were no different than that of controls and the response to 4 ml./kg. was no different than that to 1 ml./kg. of the present clear laxative-antacid.

When intestinal water content was expressed as a percentage of the dry weight of intestinal contents, the responses to the doses of clear laxative-antacid were graded still but not significantly so, nor were the responses to Milk of Magnesia. By this measure, however, all three doses of clear laxative-antacid composition of this invention exceeded the effectiveness of even the highest dose, 4 ml./kg. of Milk of Magnesia. On this basis, clear laxative-antacid was 12½ times as potent as Milk of Magnesia, with a lower limit of 4. The potency estimate is necessarily broad because of the shallow slope of the dose-response curve.

Comparison of laxative effectiveness between composition of this invention and commercial Milk of Magnesia in terms of gastric motility in rats Materials tested: 1.0, 2.0 and 4.0 ml./kg. clear laxative Formula No. 195.[1]

1.0, 2.0 and 4.0 ml./kg. commercial Milk of Magnesia.[1]

Control—A test meal consisting of 10% charcoal suspended in 5% gum acacia.

Procedure: Fasted animals are dosed orally at 10 ml./kg. with a test meal composed of 10% charcoal suspended in 5% gum acacia. Animals in the control group receive the test meal only, while those in the test groups receive a test meal which also includes the preparation under investigation. Exactly 15 minutes following medication, the animal is sacrificed and the intestine is removed. The length of the intestine from the pylorus to the cecum is measured, as well as the distance traversed by the test meal within the intestine. The latter measurement is also expressed as the "percentage of the length of the intestine traversed." The distance traversed in the intestine by the test meal and the percentage of the intestine traversed indicate the degree of laxative activity. The test was conducted over four days with 35 animals (5 per group) run on each of the test days. Test groups were balanced with respect to body weight of animals.

The results of these tests are summarized in Table II below. The legends CL4, CL2, CL1, PH4, PH2, PH1 and PL have the same significance ascribed to them above in Table I.

TABLE II
[Comparison of clear laxative-antacid Formula No. 195 vs. commercial Milk of Magnesia]

| Avg. body weight (gms.) | Avg. length of intestine (cms.)[1] | Average length of intestine (cms.) | | | | Average distance traversed (cms.) | Average percent of intestine traversed |
|---|---|---|---|---|---|---|---|
| | | 1/6/70 | 1/7/70 | 1/8/70 | 1/9/70 | | |
| 144.25 PL | 121.03 PH1 | 119.28 CL1 | 126.02 PH1 | 120.78 PH4 | 124.80 PL | 98.47 CL1 | 82.0 CL4 |
| 144.15 PH2 | 119.28 PL | 118.00 PH2 | 121.52 PH2 | 120.02 PH1 | 123.52 PH1 | 98.10 CL4 | 81.4 CL1 |
| 143.15 CL2 | 118.83 CL2 | 117.78 PH4 | 121.28 PL | 119.76 CL2 | 122.82 CL4 | 97.58 CL2 | 80.8 CL2 |
| 143.10 PH1 | 118.08 PH2 | 116.76 CL4 | 119.26 CL2 | 118.02 PL | 122.78 CL2 | 89.33 PH4 | 72.9 PH2 |
| 142.90 CL4 | 117.09 CL4 | 114.54 PH1 | 116.52 CL1 | 114.52 CL4 | 118.52 PH2 | 88.90 PH2 | 72.7 PH4 |
| 142.50 CL1 | 116.78 PH4 | 113.52 CL2 | 114.78 PH4 | 114.26 PH2 | 117.28 CL1 | 87.96 PH1 | 71.2 PH1 |
| 130.85 PH4 | 115.53 CL1 | 113.02 PL | 114.26 CL4 | 109.04 CL1 | 113.76 PH4 | 81.59 PL | 64.9 PL |

[1] Denotes presence of a significant day x product interaction. Product comparisons, therefore, were made within a test day.

As indicated above, both drugs were tested orally in fasted rats at the same dose level of 1, 2 and 4 ml./kg. Although responses to both drugs tended to correlate directly with size of doses administered to the rats, statistically they were not significantly different from each other within each drug treatment, albeit both drug effects differed from placebo controls. Consequently, no dose-response relationship was available with which to estimate their relative potencies. On the basis of minimal and maximal responses to these doses, however, it is unequivocally apparent that the peristaltic effect of the lowest dose, 1 ml./kg., of the clear laxative-antacid of this invention exceeded that of even the highest dose of 4 ml./kg. of Milk of Magnesia, corroborating in large degree the relative potencies as estimated by the previous hydration effect.

---
[1] In a meal consisting of 10% charcoal suspended in 5% gum acacia.

What is claimed is:

1. A clear liquid laxative-antacid composition comprising an aqueous medium having incorporated therein a pharmaceutically effective amount of magnesium hydroxide; a non-toxic pharmaceutically acceptable amino acid and a non-toxic pharmaceutically acceptable oxy or oxo acid; said composition containing sufficient magnesium hydroxide to function as a laxative-antacid and sufficient amino acid and oxy or oxo acid to prevent the precipitation of insoluble magnesium compounds in said clear liquid; said oxo or oxy acid also being present in an amount so as to give the composition a pH of no greater than 9.5 and being of the formula $$(Z)_c(Y)_b(X)_a R\text{—COOH}$$

in which:
R is an aliphatic carbon chain having up to 5 carbon atoms;
X is hydroxy;
Y is keto oxygen;
Z is carboxy;
$a$ is a number from 0 to 5;
$b$ is a number from 0 to 1;
$c$ is a number from 0 to 2;
the sum of $a+b+c$ being 1 to 5;
the radicals X, Y and Z being bonded to the carbon chain R, and the remainder of the valence positions on the carbon chain R, not occupied by hydroxy, keto oxygen or carboxy being occupied by hydrogen; and said amino acid being a naturally occurring α-amino acid produced by the hydrolysis of proteins.

2. The composition of claim 1 wherein the composition has a pH of no greater than about 8.0.

3. The composition of claim 2 containing the magnesium hydroxide and amino acid in the molar ratio of 1 mole of magnesium hydroxide to 0.5 to 5 moles of amino acid.

4. The composition of claim 3 wherein the amino acid is glycine and the oxo or oxy acid is citric acid.

5. The composition of claim 4 wherein said amino acid is alanine and the oxo or oxy acid is citric acid.

6. The composition of claim 1 including a non-toxic pharmaceutically acceptable polyhydric alcohol.

7. The composition of claim 6 wherein said polyhydric alcohol is sorbitol, sucrose, glycerine or mixture thereof.

8. The composition of claim 1 in a unit dose of from 5 to 15 ml.

9. A method for inducing laxation or treating a gastric acid condition in a subject which comprises administering to said subject an effective laxative or antacid dose of the composition of claim 1.

10. The method of claim 9 wherein said dose is in the range of about 5 to 15 ml.

References Cited
UNITED STATES PATENTS

| 1,936,364 | 11/1933 | Pasternack et al. | 424—157 |
| 2,092,742 | 9/1937 | Pauley | 424—157 |
| 2,755,220 | 7/1956 | Alford et al. | 424—158 |
| 2,843,521 | 7/1958 | Entrekin | 424—157 |
| 3,208,906 | 9/1965 | Beekman | 424—158 |

FOREIGN PATENTS

| 1,031,149 | 5/1966 | Great Britain | 424—157 |

OTHER REFERENCES

Remington's Pharmaceutical Sciences, Mack Pub. Co., Easton, Pa., 1965.

ALBERT T. MEYERS, Primary Examiner

F. E. WADDELL, Assistant Examiner